US009124384B2

(12) United States Patent
Herz et al.

(10) Patent No.: US 9,124,384 B2
(45) Date of Patent: Sep. 1, 2015

(54) METHOD FOR AUTOMATIC WAVELENGTH ALLOCATION IN A WAVELENGTH DIVISION MULTIPLEXED FIBER OPTIC COMMUNICATIONS NETWORK

(75) Inventors: Frederick S. M. Herz, Warrington, PA (US); Jonathan M Smith, Princeton, NJ (US)

(73) Assignee: Fred Herz Patents, LLC, Milton, WV (US)

( * ) Notice: Subject to any disclaimer, the term of this patent is extended or adjusted under 35 U.S.C. 154(b) by 993 days.

(21) Appl. No.: 10/202,070

(22) Filed: Jul. 23, 2002

(65) Prior Publication Data

US 2003/0025964 A1    Feb. 6, 2003

Related U.S. Application Data

(60) Provisional application No. 60/307,091, filed on Jul. 23, 2001.

(51) Int. Cl.
*H04J 14/02* (2006.01)

(52) U.S. Cl.
CPC .......... *H04J 14/0227* (2013.01); *H04J 14/025* (2013.01); *H04J 14/0226* (2013.01); *H04J 14/0238* (2013.01); *H04J 14/0246* (2013.01); *H04J 14/0282* (2013.01)

(58) Field of Classification Search
USPC .............................................. 398/48, 49, 50
See application file for complete search history.

(56) References Cited

U.S. PATENT DOCUMENTS

| | | | |
|---|---|---|---|
| 5,754,938 A | 5/1998 | Herz et al. | 455/4.2 |
| 6,029,195 A | 2/2000 | Herz | 709/219 |
| 6,047,327 A * | 4/2000 | Tso et al. | 709/232 |
| 6,239,888 B1 * | 5/2001 | Willebrand | 398/129 |
| 6,404,779 B1 * | 6/2002 | Silvers | 370/493 |
| 6,535,313 B1 * | 3/2003 | Fatehi et al. | 398/101 |
| 6,636,342 B2 * | 10/2003 | Furusawa et al. | 359/326 |
| 2002/0186433 A1 * | 12/2002 | Mishra | 359/128 |
| 2002/0196929 A1 * | 12/2002 | Smith et al. | 379/266.01 |
| 2003/0025964 A1 | 2/2003 | Herz et al. | 359/124 |

OTHER PUBLICATIONS

A. Krishnamoorthy et al., "Optoelectronic-VLSI: Photonics Integrated with VLSI Circuits", IEEE Journal of Selected Topics in Quantum Electronics, vol. 4, No. 6, Nov./Dec. 1998.*
Y. Chen et al., "Proportional QoS over WDM Networks: Block Probability", Sixth IEEE Symposium on Computer and Communications, Jul. 3-5, 2001.*

X. Jia et al., "Optimization of Wavelength Assignment for QoS Multicast in WDM Networks", IEEE Transactions on Communications, vol. 49, No. 2, Feb. 2001.*
Hadzic, I. et al., "On-the-Fly Programmable hardware for Networks", *IEEE Globecom*, 1998, Conference Record vol. 2 of 6, 821-826.
Maeda, M., "Management and Control of Transparent Optical Networks", *IEEE Journal on Selected Areas in Communications*, 1998, 16(7), 1008-1023.
Marcus, W. et al., "Protocol Boosters: Applying Programmability to Network Infrastructures", *IEEE Communications Magazine*, 1998, 36(10), 79-83.
McGreer, K.A., "Arrayed Waveguide Gratings for Wavelength Routing", *IEEE Communications Magazine*, 1998, 36(12), 62-68.
Nesset, D. et al., "All-Optical Wavelength Conversion Using SOA Nonlinearities", *IEEE Communications Magazine*, 1998, 36(12), 56-61.
Sadot, D. et al., "Tunable Optical Filters for Dense WDM Networks", *IEEE Communications Magazine*, 1998, 36(12), 50-55.
Senior, J.M. et al., "Developments in Wavelength Division Multiple Access Networking", *IEEE Communications Magazine*, 1998, 36(12), 28-38.
Tong, F., "Multiwavelength Receivers for WDM Systems", *IEEE Communications Magazine*, 1998, 36(12), 42-49.
Zirngibl, M., "Multifrequency Lasers and Applications in WDM Networks", *IEEE Communications Magazine*, 1998, 36(12), 39-41.
Acampora, A. et al., "UniNet: A Hybrid Approach for Universal Broadband Access Using Small Radio Cells Interconnected by Free-Space Optical Links", *IEEE Journal on Selected Areas in Communications*, 1998, 16(6), 973-988.
Acampora, A., "A Broadband Wireless Access Network Based on Mesh-Connected Free-Space Optical Links", *IEEE Personal Communications*, 1999, 6(5), 62-65.
Acampora, A., "Last Mile by Laser", *Scientific American*, 2002, www.sciam.com, 49-53.
Hadzic, I et al., "P4: A Platform for FPGA Implementation of Protocol Boosters", 1997, *Field Programmable Logic and Applications Conference*, 7th International Workshop, FPL 1997, 438-447.
Smith, J. et al., "ACTIVE Interconnects: Let's have some guts!", *IEEE Hot Interconnects Workshop*, 1998, 159-173.
Kunzig, R., Trapping Light : This is the Future, and it Moves at 186,000 Miles per Second, *Discover*, Apr. 2001, 22(4), 72-79.
DARPA VLSI Photonics, http://www.darpa.mil/ETO/VLSI/index.html, Home Page, Last Updated Apr. 17, 2007.
Yablonitch, E., "Photonics Crystals: Semiconductors of Light", *Scientific American*, Dec. 2001, 47-55.

* cited by examiner

*Primary Examiner* — Shi K Li

(74) *Attorney, Agent, or Firm* — Baker & Hostetler LLP

(57) ABSTRACT

The high data transmission capacity of fiber optic networks has been exploited through wavelength division multiplexing (WDM). By using multiple independent wavelengths, or lambdas, the fiber can carry a multiplicity of content, each in its own lambda. As the number of lambdas increases (it is currently ca. 100 and is projected to climb to 100,000 or more) it becomes increasingly challenging to allocate lambdas to traffic. The present invention automates the allocation process by detecting similar interests amongst groups of users, and creating a shared lambda for use by the users.

36 Claims, No Drawings

METHOD FOR AUTOMATIC WAVELENGTH ALLOCATION IN A WAVELENGTH DIVISION MULTIPLEXED FIBER OPTIC COMMUNICATIONS NETWORK

CROSS REFERENCES TO RELATED APPLICATIONS

The present application claims priority under 35 U.S.C. §119(e) to U.S. Provisional Patent Application No. 60/307,091, filed Jun. 23, 2001, the contents of which are incorporated herein by reference.

BACKGROUND OF THE INVENTION

Fiber optic networks offer significant advantages over conventional transmission media such as copper wire or other electrical transmission means. First of these is the bandwidth of a single channel (which can be greater than $10^{10}$ bits per second). The second is that the photonic systems can concurrently carry a multiplicity of such channels, each using a distinct wavelength of light. As of the date of this patent application, systems with 80 or more wavelengths have been commercially deployed, and laboratory successes lead to predictions of 100,000 or more deployed wavelengths.

A major challenge in the design of data transmission systems is the allocation of channel capacity to user traffic. The traditional technique developed by telecommunications companies is the use of "Add-Drop Multiplexers" or ADMs, which compose channels into a larger channel (multiplexing) and decompose channels from the larger capacity channel into their constituent parts. This technique is well-suited to single channels of high capacity, as it fills the capacity with a plurality of traffic from lower capacity channels.

The availability of a large number of such channels on a single fiber could lead to two scenarios. In one, multiple static multiplexing hierarchies are borne by the photonic transmission system, one per channel. This is the situation today, to first order. The agility of the system, independent of what it is capable of technically (the wavelength reassignment time) is limited here by the management scheme used for traffic engineering.

The second scenario is one where a traditional multiplexing hierarchy is not imposed—rather, the lambdas are managed to serve the needs of user traffic as it arises. This differs from the previous scenario in both the pace of adaptation, and the motivations for wavelength allocation. Simply put, the driver is neither (although it could be any thresholding function as disclosed here) revenue thresholds nor negotiated customer service level agreements. Rather, it is user needs driving allocation, at as fine a granularity as allowed by the engineering of the photonic systems and their retuning/reallocation capabilities.

The disclosed Multiple Independent Color Architecture (MICA) automates the allocation and deallocation of channels in a WDM fiber system based on user behavior and the characteristics of user traffic. In doing so, it automates a manual, slow and expensive allocation process, giving a system which is more responsive, makes better use of fiber capacity, better connects fiber capabilities to user needs, and reduces operational costs.

BRIEF SUMMARY OF THE INVENTION

It is a fact that fiber optic networks through their utilization of wavelength division multiplexing (WDM) have been able to achieve very high data transmission capacities in as much as a multiplicity of content can be assigned each to its own particular wavelength among a potential plethora of multiple independent wavelengths or Lambdas. It is anticipated that current and future advances in optical networks and their associated optical system elements will bring about a rapid and abrupt explosion in the current carrying capacity of optical fiber through technologies which will increase the number of wavelengths which can be wavelength division multiplexed within a given optical fiber. The present invention attempts to solve the associated emerging problem and increasingly complex challenge of how to best allocate lambdas to traffic across optical links. The present invention suggests a number of ways in which detection of similar interests among groups of users and network nodes which may further be augmented by statistical information of almost any available type which is usefully employable to the advantage of the system's end objectives. The present invention can be used for creating a shared lambda resulting in a variety of important resource conservation benefits and other increasingly critical advantages.

DETAILED DESCRIPTION OF EXEMPLARY EMBODIMENTS

1. Introduction

In U.S. Pat. Nos. 5,754,938 and 6,029,195 (incorporated herein by reference), the present inventors disclosed methods for optimizing network information flow and increasing personalization of the network services to users. The basic principle is the detection and exploitation of statistical information regarding the users and their behavior. A simple example of the types of information exploited would be: (1) the time of day when a user is commonly using the network; (2) the bandwidth utilization of the user during these periods; (3) the user's geographic location; (4) the rank-ordered list of sites or persons accessed by the user; and (5) the on-line activities of the user at the present time. The information, gathered through user monitoring, is aggregated into profiles, which can then be used to detect similarities among users. It is these similarities which allow the statistical inference of, and automated formation of, "interest groups" to which content or network caching preferences can be directed.

Rather than recount that material, it is leveraged here to the task of allocating lambdas in wavelength-division multiplexed fiber optic networks by allocating a new wavelength when (1) a statistical similarity is detected amongst network users, and (2) an allocable wavelength is available. Wavelength-division multiplexed fiber optic networks are described, for example, in John M. Senior, Michael R. Handley and Mark S. Leeson, "Developments in Wavelength Division Multiple Access Networking," IEEE Communications Magazine 36(12), December 1998, pp. 28-38; Martin Zirngibl, "Multifrequency Lasers and Applications in WDM Networks," IEEE Communications Magazine 36(12), December 1998, pp. 39-41; Frank Tong, "Multiwavelength Receivers for WDM Systems," IEEE Communications Magazine 36(12), December 1998, pp. 42-49; and Dan Sadot and Efraim Boimovich, "Tunable Optical Filters for Dense WDM Networks," IEEE Communications Magazine 36(12), December 1998, pp. 50-55.

Wavelength division multiplexing is analogous to a multi-lane highway. The number of lanes and the speed limit within each lane are both climbing, with the positive consequences for traffic carrying capacity. However, for a variety of technical reasons, it appears that packet-switching at the highest optical rates is hard, and will remain hard, due to the difficulties with tuning and the slow maturing of other photonic technologies as described by Derek Nesset, Tony Kelly and Dominique Marcenac in "All-optical wavelength conversion using SOA nonlinearities," IEEE Communications Magazine 36(12), December 1998, pp. 56-61, and by Kenneth A. McGreer in "Arrayed Waveguide Gratings for Wavelength Routing," IEEE Communications Magazine 36(12), December 1998, pp. 62-68. In spite of progress with the retuning problem as described by A. Leo in "Nanolaser Tag", Technology Review, Jun. 11, 2001, an even greater difficulty is the lack of buffering used to implement the store-and-forward model of packet switching used in the Internet.

The present preponderant architecture is one of optical cross-connects, points at which the fiber is interrupted by electronic components that can process some data and serve as a control and management "plane" for the network. M. Maeda in "Management and Control of Transparent Optical Networks," IEEE JSAC 16(7), September 1998, pp. 1008-1023, provides a good overview of the basic architecture. Having an automated method for allocating wavelengths to traffic would greatly reduce the cost of operating the network at the same time that network utilization was improved through more dynamic use of the channel resources.

Dynamic exploitation of channel resources requires network embedded programmability in the style described by W. Marcus, I. Hadzic, T. McAuley, and J. Smith in "Protocol Boosters: Applying Programmability to Network Infrastructures," IEEE Communications, Vol. 36(10), pp. 79-83 (October 1998), by I. Hadzic, W. Marcus, and J. Smith in "On-the-fly Programmable Hardware for Networks," in IEEE GLOBECOM 98, Sydney, AU (November, 1998), by I. Hadzic and J. Smith in "P4: A platform for FPGA implementation of Protocol Boosters," Springer-Verlag (1997), pp. 438-447 (Field Programmable Logic 1997 Conference), and by J. Smith, I. Hadzic, and W. Marcus in "ACTIVE Interconnects: Let's have some guts!," in Proceedings, IEEE Hot Interconnects Workshop, Palo Alto, Calif. (Aug. 13-15, 1998), pp. 159-173. Specialized network elements can deliver this network-embedded programmability, specifically for monitoring, management and control, for all-optical networks. While electronic processor core performance has remained comparable to optical network throughputs, other components (e.g., DRAMs and busses) seriously fail to track the wavelength throughput product of WDM technology. This makes conventional architectures increasingly ill-suited to a high-bandwidth all optical regime. There are compelling applications which demand the flexibility and control inherent in network-embedded programmable components. In particular, the rapid allocation and release of wavelengths will demand such performance.

Network embedded processing elements are adjacent to a wavelength selective optical cross-connect (OXC) node supporting an Optical Supervisory Channel (OSC). The processing element processes selected channels from the fiber. Any wavelength is a candidate for processing, although we will typically designate selected channels for control and processing, while other channels pass through unprocessed. Selection is performed with a wavelength add-drop multiplexer/wavelength converter. Selected channels may be used to control more deeply network-embedded elements.

The architecture of the invention locates network-embedded portions of the control plane on the electronics, and the transport plane on the optical system. This separates policy from mechanism at the component level, while operating at the performance levels of an integrated hybrid system. By embedding control operations, the huge difference in timescales between individual optical events and network round-trip times can be attacked. While already a problem in the current Internet, huge bandwidth delay products will make edge-directed control increasingly difficult with increasing optical link bandwidths. While the algorithms described herein can operate successfully at the edge of the network, the performance will not be as high as when portions of the dynamic resource allocation scheme are embedded in the network, due mainly to latency considerations which reduce the dynamics of the system's response.

Many implementations of these processing elements are possible, ranging across various performance and price tradeoffs. Examples include fast general purpose processors and more specialized chips such as media processors (which can be seen as small SIMD parallel processors), as well as VLSI photonics as described in DARPA VLSI Photonics, http://www.darpa.mil/ETONLSI/index.html.

The attractiveness of embedded processing is the ability to provide flexible on-demand transformations of information in-transit, where in many cases the transformations are determined by the data themselves. Thus, for example, in IP packet switching, the data frames contain an address which is used to make routing decisions, with more recent routing software using additional features to provide QoS, service classes, packet filters, multicast, etc. Active networks take this idea further still by exposing processing to in-transit packets. The most likely short-term use of active networking technologies is for network management and control, and network embedded processing will allow operations to occur at the short timescales inherent in transparent optical networks.

2. Algorithms

Consider a set of wavelengths $L(1), L(2), \ldots L(n)$. Assume that $L(1) \ldots L(k)$ are allocated, and that $k<n$. Assume further that there are a set of users $U(1), \ldots U(m)$, communicating using one or more of the wavelengths $L(1), L(2), \ldots L(k)$.

Assume that some subset S of $U(1), \ldots U(m)$ has been determined to exhibit similarities according to the analytic techniques disclosed in U.S. Pat. Nos. 5,754,938 and 6,029, 195. Call the members of this subset $S(1), \ldots, S(o)$, where $o<=m$. If the traffic generated by $S(1), \ldots, S(o)$ exceeds a threshold $T(h)$ (which may be determined by the type of similarity deduced amongst the elements of S), and $k<n$, then the communications amongst the members of this set are allocated to a newly allocated wavelength $L(k+1)$. If $k=n$, then there is no wavelength free, and we can either not allocate traffic or distribute the traffic of the least loaded wavelength $L(1)$ across other wavelengths using some algorithm (for example random uniform distribution) and utilize $L(1)$ for carrying the traffic for S.

When the traffic on some wavelength $L(1)$ falls below a threshold $T(1)$, then we can determine which users share the wavelength. Call these users $S(1), \ldots, S(o)$. Then, as when freeing a wavelength, the traffic from this set of users can be distributed across other active wavelengths. It is easy to renumber the wavelengths for convenience so that free wavelengths are at the end of the numbers $k+1, \ldots, n$. $T(h)$ and $T(1)$ are conveniently viewed as high and low water marks for traffic load, and can be any measurable value or metric, such as average bandwidth, peak bandwidth, or average burst duration in a specified interval.

It is important to note that the basic algorithm can be applied to prediction. This is easy as we can use a function $Pf(T,t)$ to estimate the value of the threshold at some time t. So for example, if we have a high quality predictor function $Pf( )$ we can predict when a wavelength will be required by a set of users, and preallocate the wavelength. If retuning is slow, this provides a significant gain as there is no wait when the prediction function is accurate—for a retuning time R, we predict $Pf(T(h),R)$ to see if the threshold will be exceeded and if an allocation will be necessary. If it is, we can begin the allocation actions in advance, so the wavelength is ready when necessary. When R is short, as it would be with highly dynamic retuning systems, the system can be allocated and deallocated at an extremely fine granularity, making excellent use of the optical network resources by interleaving bursts of bandwidth in intervals delineated by the retuning time R. This approach is particularly useful for groups of users U(1) . . . U(m) that communicate over a given optical fiber link in a WDM optical fiber network. In such a configuration, the wavelengths over the optical fiber link may be freed and reallocated dynamically. The allocation may be performed periodically and the threshold by be determined periodically and/or dynamically based on traffic on the given fiber optic link.

3. Implementation Considerations

The system can be implemented on any system which permits wavelength division multiplexing, which today includes fiber optic systems implemented using fiber optics, plastic optical fiber, glass, and free-space optics as described by A. Acampora in "Last Mile by Laser", Scientific American, Jun. 17, 2002; A. Acampora and S. Krishnamurthy in "A Broadband Wireless Access Network Based on Mesh-Connected Free-Space Optical Links," IEEE Personal Communications, 6(5), October 1999; and A. Acampora, S. Krishnamurthy and S. Bloom in "UniNet: A Hybrid Approach for Universal Broadband Access Using Small Radio Cells Interconnected by Free-Space Optical Links," IEEE JSAC, 16(6), pp. 973-988, August 1998. An important consideration in highly dynamic optical systems is the fact that Pf( ) could be used to set up and tear down allocations as bursts of data moved through the network, analogous to a train moving through a tunnel. Pf(T(h),R) would be used to set up the allocation as the head of the train of packets arrived, and Pf(T(1),R+train duration) would be used to tear down the allocation as the burst of packets subsided.

4. Applications

An important application of the disclosed system is to distributed processing, with the more explicit goal of a multiprocessor interconnected by optical links. In this context the connected processors would be viewed as the user set U, and the subset of the processors communicating on a specific problem, such as that computed by a distributed subroutine, might comprise S.

Then the highly parallel nature of wavelength division multiplexing would allow the non-interfering communications amongst many disjoint sets of communicating computations. Depending upon the retuning time R, the granularity of program segment allocating wavelengths could be as small as a single subroutine or procedure call, or alternatively if R is large, then the granularity of program segment might be the execution of a complete program. Information, even if statistical, about when modules would execute or communicate could be encoded in Pf( ) in order to ensure that waiting for network resources is minimized, and thus use of the network for these distributed computations would be extremely efficient. Additionally, regardless of the application use context of the communication, if waiting for network resources is unavoidable, and more than one communicating set is in need of the same resource, e.g., an available wavelength, information concerning the total amount of network traffic needed for that set can be additionally leveraged for purposes of aiding in the objective of achieving a more optimally determined allocation of the resource in view of the present system framework and its associated ability to utilize potentially any useful and available statistical information for its desired objectives as herein suggested. This information can include, but is not limited to, the average number of intervening network nodes among the members of the set, average and/or total amount of bandwidth needed for interset communication, size of set membership timing or immediacy of demand for utilization of the resource by the set, etc.

Given the system resource constraint, in the scenario above suggested, the incorporation of such additional types of variables within the framework of the presently identified methodology would further naturally produce conditions by which as suggested by way of the present disclosure utilization demand of especially certain types of resources becomes more homogeneously distributed in general to where and when allocable availability of that resource inherently exists.

Although the application example given is of a distributed multiprocessor system, existing and emerging technologies will soon allow for analogous system architectures within one physical system including communications among processors located internal or external to a network, where the processors are general purpose processors or processors specialized for network data processing. As noted above, the processors may also employ VLSI photonics to improve interaction between electronic and photonic subsystems as appropriate. Additionally, the fact that the descriptions given represent the current state of the art, i.e., hybrids of various optical and electronic elements, should not be construed as a limitation on this idea. The same concepts apply equally as well to any system containing optical components, including systems of all-optical elements. Systems, here, is used to include not just networks exclusively, but any analogous optical system and/or subsystem, e.g., optical RAM, optical CPUs, optical micro-circuitry, etc.

MICA allows any, or all, of these possibilities or associated sets of possibilities, using the optical medium as a dynamic highly parallel switching medium.

5. (Future) Example Case

For a variety of reasons, the long-term potential role and significance of MICA within next-generation optical networks is anticipated to expand substantially as advancements in such technology sub-domains as truly all optical processing and distributed processing, all optical routers, all optical switches, all optical microcircuits and gates, etc. begin to evolve and emerge from the present state of the art. For example, one future scenario for which MICA could successfully address a significant problem which is emergent as a consequence of such advances occurs within the context of an all optical network (or more generally speaking, an all optical system) in which all routing, memory and processing occurs continuously and in seamlessly integrative fashion within an uninterrupted photonic state. In this scenario, because such all optical processing may conceivably be able to occur at or near the speed of light, it becomes of even greater critical importance to have an allocable wavelength(s) pre-assigned and thus available at the specific connections needed by the system within a temporal time frame which is no less than at the absolute instant that the system's demand for such a connection(s) emerges. Accordingly, it will be obvious to the artfully skilled reader that in addition to the other system wide advantages s stated herein, the solution to this above-stated problem is successfully achieved through MICA's novel system characteristics, particularly in view of inherent competing optical resource system constraints as herein suggested.

It will be further appreciated that the traffic threshold defined herein may be determined based on membership of the users U(1) . . . U(m) in a predefined group. For example, in the distributed processing example, the predefined group may be the processors participating in a distributed computation.

We claim:

1. A method of allocating wavelength channels in a wavelength division multiplexing (WDM) system, comprising the steps of:
   monitoring activity of users of the WDM system that are communicating using one or more wavelengths of the WDM system and aggregating collected information into user profiles;
   detecting statistical similarities among said users based on said user profiles; and
   allocating a wavelength channel for communications amongst members of a subset of said users, where said subset of said users have been detected in said detecting step to exhibit statistical similarities based on said user profiles.

2. A method as in claim 1, wherein said wavelength channel is allocated for communications amongst members of the subset of users when traffic generated by the subset of users exceeds a threshold level and a wavelength channel is free.

3. A method as in claim 2, wherein when traffic generated by the subset of users exceeds the threshold level but no wavelength channel is free, said allocating includes distributing traffic of a wavelength channel across other wavelengths channels using a predetermined algorithm to create an unloaded wavelength channel and utilizing the unloaded wavelength channel for communications amongst members of the subset of users.

4. A method as in claim 3, comprising the further step of deallocating the wavelength channel when the traffic generated by the subset of users drops below the threshold level.

5. A method as in claim 3, wherein the predetermined algorithm provides a random uniform distribution of the traffic from a least loaded wavelength channel across the other wavelength channels.

6. A method as in claim 3, comprising the further steps of:
   detecting whether traffic generated by the subset of users falls below said threshold level; and
   if traffic generated by the subset of users is below said threshold level, determining which users share the allocated wavelength channel and distributing the traffic from the determined users across other active wavelength channels of the WDM system.

7. A method as in claim 3, wherein traffic generated by the subset of users is determined by measuring average bandwidth, peak bandwidth, and/or average burst duration in a specified interval for traffic generated by said subset of users.

8. A method as in claim 3, comprising the further steps of:
   predicting traffic to be generated by the subset of users at a time t; and
   preallocating the wavelength channel for traffic generated by the subset of users at time t.

9. A method as in claim 8, wherein the preallocating step begins at a time on or before time t-R where R is a retuning time for the wavelength channel being preallocated.

10. A method as in claim 9, wherein the predicting step predicts when bursts of data traffic move through the WDM network and the wavelength channel is preallocated to accept the bursts of data traffic as they arrive.

11. A method as in claim 10, wherein the wavelength channel is deallocated once the bursts of data traffic have passed through the wavelength channel.

12. A method as in claim 3, wherein the threshold level is determined periodically.

13. A method as in claim 3, wherein the threshold level is determined dynamically based on traffic generated by the subset of users.

14. A method as in claim 1, wherein the wavelength channel is allocated and reallocated dynamically based on traffic generated by the subset of users.

15. A method as in claim 1, wherein the allocating step is performed periodically.

16. A method as in claim 1, wherein the monitored activity includes the time of day when a user is commonly using the WDM system, bandwidth utilization of the user when using the WDM system, the user's geographic location, rank-ordered lists of sites or persons on the WDM system accessed by the user, and/or on-line activities of the user at a given time.

17. A method as in claim 1, wherein users of the WDM system with statistically similar profiles are placed in a subset of users to which content or network caching preferences for said WDM system are directed.

18. A method of allocating wavelength channels in a wavelength division multiplexing (WDM) optical fiber network having a plurality of optical fiber links, comprising the steps of:
   monitoring activity of users of the WDM optical fiber network that are communicating using one or more wavelengths of the WDM optical fiber network and aggregating collected information into user profiles;
   detecting statistical similarities among said users based on said user profiles; and
   allocating a wavelength channel over a given fiber optic link for communications amongst members of a subset of said users, where said subset of said users have been detected in said detecting step to exhibit statistical similarities based on said user profiles.

19. A method as in claim 18, wherein said wavelength channel is allocated for communications amongst members of the subset of users when traffic generated by the subset of users exceeds a threshold level and a wavelength channel is free.

20. A method as in claim 19, wherein when traffic generated by the subset of users exceeds the threshold level but no wavelength channel is free, said allocating includes distributing traffic of a wavelength channel across other wavelengths channels of the given fiber optic link using a predetermined algorithm to create an unloaded wavelength channel and utilizing the unloaded wavelength channel for carrying traffic generated by the subset of users over the given fiber optic link.

21. A method as in claim 20, comprising the further step of deallocating the wavelength channel when the traffic generated by the subset of users over the given fiber optic link drops below the threshold level.

22. A method as in claim 20, wherein the predetermined algorithm provides a random uniform distribution of the traffic from a least loaded wavelength channel across the other wavelength channels.

23. A method as in claim 20, comprising the further steps of:
   detecting whether traffic generated by the subset of users over the given fiber optic link falls below said threshold level; and
   if traffic generated by the subset of users over the given fiber optic link is below said threshold level, determining which users share the allocated wavelength channel and distributing the traffic from the determined users across other active wavelength channels of the given fiber optic link.

24. A method as in claim 20, wherein traffic generated by the subset of users over the given fiber optic link is determined by measuring average bandwidth, peak bandwidth, and/or average burst duration in a specified interval for traffic generated by said subset of users over the given fiber optic link.

25. A method as in claim 20, comprising the further steps of:
predicting traffic to be generated by the subset of users over the given fiber optic link at a time t; and
preallocating the wavelength channel for traffic generated by the subset of users over the given fiber optic link at time t.

26. A method as in claim 25, wherein the preallocating step begins at a time on or before time t-R where R is a retuning time for the wavelength channel being preallocated.

27. A method as in claim 26, wherein the predicting step predicts when bursts of data traffic move through the given fiber optic link and the wavelength channel is preallocated to accept the bursts of data traffic as they arrive in said given fiber optic link.

28. A method as in claim 27, wherein the wavelength channel is deallocated once the bursts of data traffic have passed through the wavelength channel.

29. A method as in claim 20, wherein the threshold level is determined periodically.

30. A method as in claim 20, wherein the threshold level is determined dynamically based on traffic generated by the subset of users over the given fiber optic link.

31. A method as in claim 18, wherein the wavelength channel is allocated and reallocated dynamically based on traffic generated by the subset of users.

32. A method as in claim 18, wherein the allocating step is performed periodically.

33. A method as in claim 18, wherein the monitored activity includes the time of day when a user is commonly using the WDM optical fiber network, bandwidth utilization of the user when using the WDM optical fiber network, the user's geographic location, rank-ordered lists of sites or persons on the WDM optical fiber network accessed by the user, and/or on-line activities of the user at a given time.

34. A method as in claim 18, wherein users of the WDM optical fiber network with statistically similar profiles are placed in a subset of users to which content or network caching preferences for said WDM optical fiber network are directed.

35. A method of allocating wavelength channels in a wavelength division multiplexing (WDM) system, comprising the steps of:
monitoring activity of users of the WDM system that are communicating using one or more wavelengths of the WDM system, wherein the monitored activity includes bandwidth utilization of the user when using the WDM system, rank-ordered lists of sites or persons on the WDM system accessed by the user, and/or on-line activities of the user at a given time;
aggregating collected information from said monitoring step into user profiles;
detecting statistical similarities among said users based on said user profiles and forming an interest group of users exhibiting statistical similarities; and
allocating a wavelength channel for communications amongst members of said interest group of users.

36. A method as in claim 35, wherein said WDM system is a WDM optical fiber network having a plurality of optical fiber links and the allocating step comprises allocating a wavelength channel over a given fiber optic link.

* * * * *